United States Patent [19]

Kelian

[11] Patent Number: 4,647,758
[45] Date of Patent: Mar. 3, 1987

[54] VERTICAL GRILLE

[76] Inventor: Vatcho Kelian, Lot 10, Victoria Street, Gorrie, Ontario, Canada, N0G 1X0

[21] Appl. No.: 754,259
[22] Filed: Jul. 12, 1985
[51] Int. Cl.⁴ .......................... H05B 3/64; A47J 37/08
[52] U.S. Cl. .................................... 219/385; 219/521; 99/391; 99/402; 99/449; 99/400
[58] Field of Search ............... 219/385, 386, 387, 521, 219/445, 464, 405, 411; 99/389, 391, 392, 393, 394, 402, 449, 450, 400, 401; 126/275 E

[56] References Cited

U.S. PATENT DOCUMENTS

| | | | |
|---|---|---|---|
| 716,365 | 12/1902 | Bayno | 99/392 |
| 917,195 | 4/1909 | Van Aller | 99/400 |
| 1,444,945 | 2/1923 | Bogusky | 99/400 |
| 1,543,362 | 6/1925 | Boletino | 99/400 |
| 1,717,592 | 6/1929 | Wheelock | 99/392 |
| 1,903,324 | 4/1933 | Codling | 99/392 |
| 1,996,297 | 4/1935 | Langenfeld | 99/389 |
| 2,069,824 | 2/1937 | Engel | 99/400 |
| 2,397,040 | 3/1946 | Pallich | 99/392 |
| 2,689,517 | 9/1954 | Angelus | 219/388 |
| 2,717,951 | 9/1955 | Swicker | 99/389 |
| 2,787,947 | 4/1957 | Schatten et al. | 99/332 |
| 2,868,111 | 1/1959 | Laskowski | 99/402 |
| 2,975,698 | 3/1961 | Miller | 99/400 |
| 3,154,005 | 10/1964 | Roecks et al. | 99/389 |
| 3,373,678 | 3/1968 | Miller | 99/389 |
| 3,906,849 | 9/1975 | Williams | 99/392 |

Primary Examiner—E. A. Goldberg
Assistant Examiner—Teresa J. Walberg
Attorney, Agent, or Firm—R. Craig Armstrong

[57] ABSTRACT

A vertical grille is disclosed, in which at least two heating elements are arranged in spaced facing relationship in substantially parallel and substantially vertical planes, defining grilling areas between them. Removable racks are associated with each grilling area for suspending the articles of food to be grilled. The rack assembly has two racks, one side of one rack detachably engaging in brackets attached to the corresponding side of the other rack, the other sides of the racks having post and post-engaging slider rods for clamping the racks together in spaced facing relationship to thereby clamp the article of food between them. A water-holding tray is positioned beneath each grilling area for holding a small quantity of water so that fat and the like falling from the articles of food falls into water in the tray and is thereby prevented from being further heated to the point of smoking. Grilling units may be ganged together in side-to-side fashion, so as to produce an array of grilling areas. Each heating element may be controlled by a rheostat, and each grilling unit may have a timer associated with its power supply.

18 Claims, 8 Drawing Figures

VERTICAL GRILLE

BACKGROUND OF THE INVENTION

1. Field of the Invention

This invention relates to a grille having vertically oriented heating elements.

2. Description of the Prior Art

Ovens with vertical heating elements are known in the prior art. For example, U.S. Pat. No. 2,397,040 (Pallich) disclosed a broiler which is somewhat similar to the simplest embodiment of the present invention. The Pallich patent discloses a broiler having two vertically oriented elements and two racks between which an article of food is placed for cooking. A drip tray catches drippings from the article of food. The Pallich device is quite closed to air circulation, and thus is more properly classified as an oven than as a grille.

SUMMARY OF THE INVENTION

It is an object of the invention to provide an improved grille.

Thus in accordance with the present invention there is provided a grille comprising at least two heating elements arranged in spaced facing relationship in substantially parallel and substantially vertical planes. Each heating element is disposed across an area in its plane, whereby grilling areas are defined between these areas in these planes. Removeable means are associated with each grilling area for suspending in the grilling areas articles of food to be grilled. A water-holding tray is positioned beneath each grilling area for holding a small quantity of water, whereby fat and the like falling from said articles of food being grilled falls into water in said tray or trays and is thereby prevented from being further heated to the point of smoking.

In accordance with another embodiment of the present invention, there is provided a grille comprising at least two grilling units ganged together in side-to-side fashion, so as to produce an array of grilling areas, each unit comprising three heating elements arranged in spaced facing relationship in substantially parallel and substantially vertical planes. Each heating element is disposed across an area in its plane, whereby grilling areas are defined between these areas in these planes. Removeable means are provided for suspending in the grilling areas articles of food to be grilled.

In accordance with another feature of the invention, the removeable means for suspending the articles of food comprises a rack assembly, the rack assembly comprising two racks. One side of one rack detachably engages in bracket means attached to the corresponding side of the other rack, and the other sides of the racks have clamping means for urging the racks together in spaced facing relationship to thereby clamp the article of food between the racks. The bracket means may comprise, for example, at least two brackets spaced apart along the side, each bracket having a plurality of slots for engaging the corresponding side of the other rack at different rack spacings as desired. The clamping means comprise at least two posts protruding from one rack towards the other, each post having a plurality of spaced recesses, the other rack having spring-biased means for engaging selected ones of these recesses.

In accordance with another feature of the invention, each heating element is controlled by a rheostat, and each grilling unit has a timer associated with its power supply so that the unit cannot be left on accidentially for longer than the time set on the timer.

Further features of the invention will be described or will become apparent in the course of the following detailed description.

BRIEF DESCRIPTION OF THE DRAWINGS

In order that the invention may be more clearly understood, the preferred embodiments thereof will now be described in detail by way of example, with reference to the accompanying drawings, in which.

DETAILED DESCRIPTION OF THE PREFERRED EMBODIMENT

Figure 1:
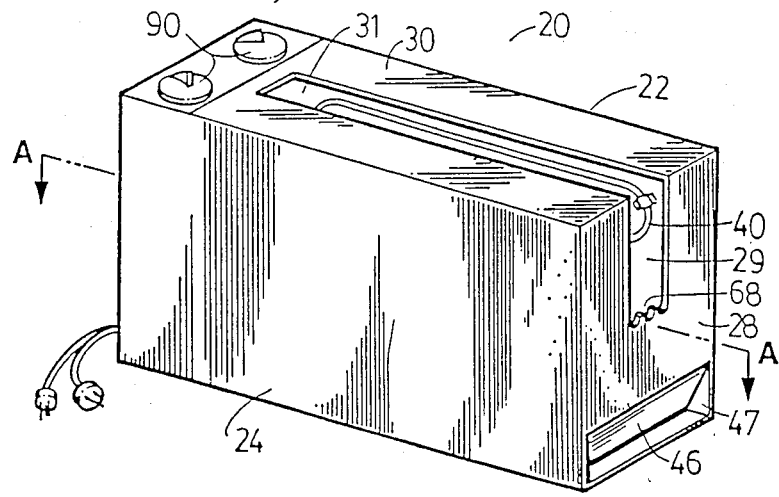
FIG. 1 is an oblique view of the simplest preferred embodiment of the present invention.
Figure 2:
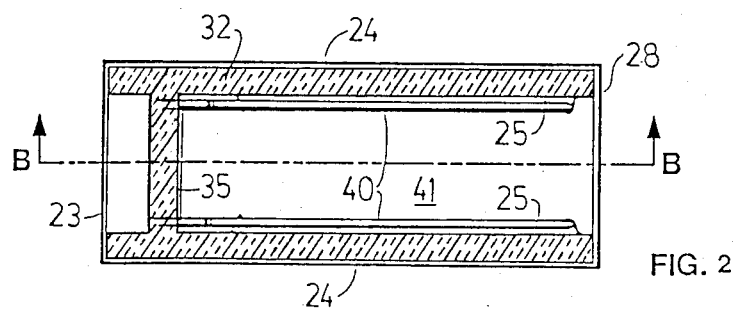
FIG. 2 is a sectional plan view showing elements of the structure of the grill housing.
Figure 3:
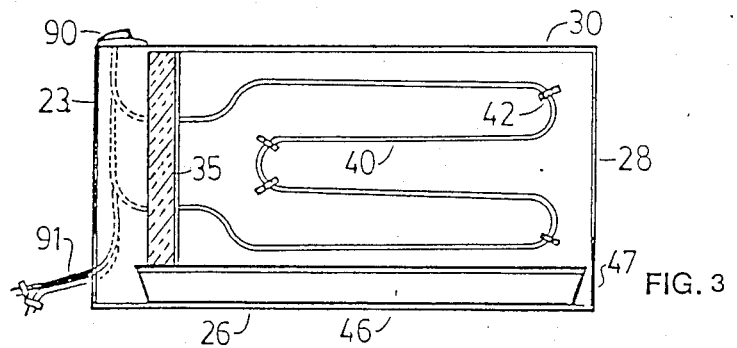
FIG. 3 is a sectional elevation showing a heating element.

Referring to FIGS. 1 through 3, there will first be described the simplest embodiment of the invention.

The grille 20 consists essentially of a housing 22, comprising two outer side panels 24, an outer back panel 25, a bottom panel 26, a front panel 28, and a top panel 30. The front panel 28 has a vertical slot 29 extending part way down the panel and having three recesses 68. The front panel does not extend all the way down the front of the grille, leaving a tray opening 47. The top panel has a central longitudinal opening 31 starting from the front and extending most of the length of the top panel. The grille is relatively open in design, so that air can circulate freely, as is desired for improved flavor and texture in grilling foods.

Referring to FIG. 2, it can be seen that insulation 32 is sandwiched between the insides of the side panels 24 and inner side panels 25, and is also positioned partially between the outer back panel 23 and an inner back panel 35. Heating elements 40 are disposed between the inner panels, secured by clips 42, defining a grilling area 41. The heating elements are controlled by rheostats 90 mounted in the area between the inner and outer back panels, with their controls protruding out the top panel. Power is supplied by means of a cable 91 entering the insulated space between the inner and outer back panels near the bottom of the grille. The heating elements are connected to the rheostats in this space in a conventional manner, the element leads projecting through holes in the inner back panel.

In order to facilitate installation in kitchens which do not have ready access to a 220 volt power supply, a "split receptacle" design may be used as depicted in FIGS. 1 and 3, each heating element being supplied by a separate 110 volt power supply, so that a two-element version, for example, may be plugged into an ordinary wall socket, each element (typically 1500 watts) taking one socket.

Beneath the grilling area 41, is a water-holding tray 46, which may be inserted and withdrawn through the tray opening 47.

Figure 4:
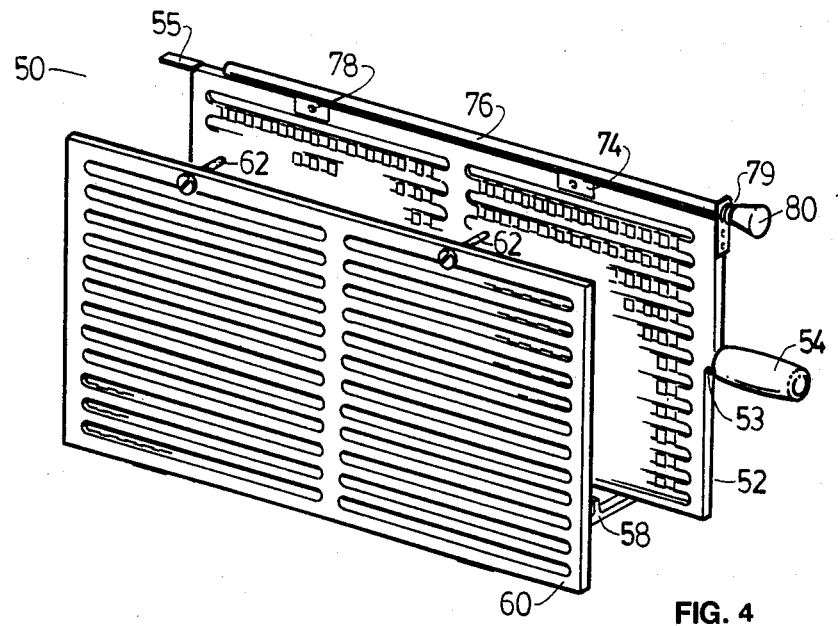
FIG. 4 is an illustration showing the food-holding racks.
Figure 5:
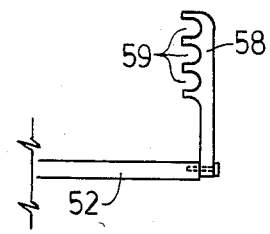
FIG. 5 is a drawing of a bracket on the racks.
Figure 6:
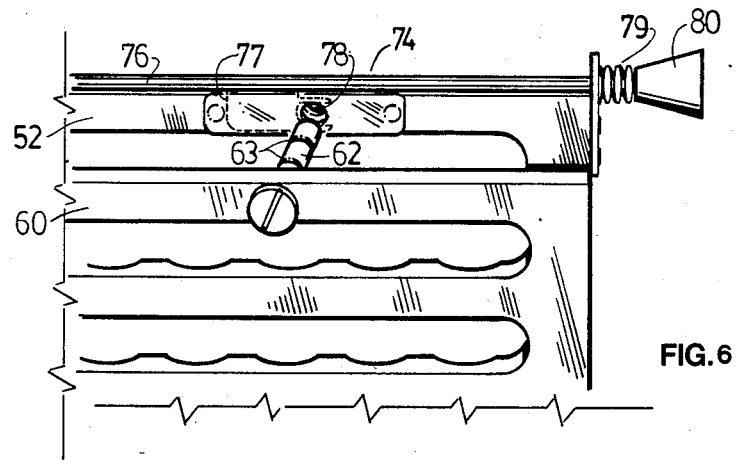
FIG. 6 is a drawing of the engagement mechanism of the racks.

A rack assembly 50, shown in FIGS. 4 through 6, and consisting essentially of a first rack 52 and a second rack 60 adapted to be clamped together in a faced spacing relationship to clamp an article of food for grilling, is positioned in the grilling area 41 when food is to be grilled. The rack assembly is properly positioned in the grilling area by virtue of the first rack 52 having a handle 54 with a notch 53 which rests in one of the recesses 68 at the bottom of the vertical slot 29 of the front panel 28, and having a flange 55 at the upper end of the rack remote from the handle, which rests on the top panel 30. The recess 68 is selected so as to center the article of food between the heating elements, the recess selected thus depending on the thickness of the article being grilled. The first rack 52 has two brackets 58 spaced along one side, each bracket having several slots 59. The corresponding side of the second rack 60 engages in selected pairs of the slots to provide whatever spacing between racks which is desireable for the particular article of food to be grilled. On the other side of the second rack are two posts 62 projecting towards the first rack and having a series of annular recesses 63. The first rack has spring-biased means 74 for engaging selected pairs of the recesses, comprising a slider rod 76 running along the side of the rack from the front, the slider rod having sliders 77 at each post location. The sliders can be moved into or out of holes 78 through which the posts pass, to engage in the selected recesses. A spring 79 (shown compressed) is mounted between the slider rod handle 80 and an apertured slider rod support 81 to bias the sliders into the engaged position.

The racks themselves are preferably coated with teflon (trademark) or some other suitable material for ease of cleaning and reduction of burning and sticking.

In operation, the grille is turned on by means of the rheostat controls, to whatever level is desired, and the article of food is clamped between the racks. The rack assembly is then placed in the grilling area, and the grilling proceeds. In the case of a piece of meat, any fat or other drippings falls into the water-holding tray 46. It is a particular advantage of the present invention that smoking is thereby avoided, since the fat does not fall onto a hot surface for further heating to the point of smoking, but instead is kept relatively cool by the water in the tray. A timer (not shown) may be placed in series with the power supply to the rheostat controls, to select a grilling time, or to guard against dangerous overcooking or forgetting to switch the grille off after use.

It will be appreciated that the grille 20 may have more than two heating elements 40, in which case two or more grilling areas are defined. Although such an embodiment is not specifically illustrated, it may be readily envisioned. If the grilling areas are separated by partitions, then two heating elements per grilling area are required. However, assuming that no partitions are used to physically separate the grilling areas, the heating elements installed between the outermost heating elements can then act on articles of food suspended on either side, so that the number of grilling areas equals the number of heating elements minus one.

Figure 7:
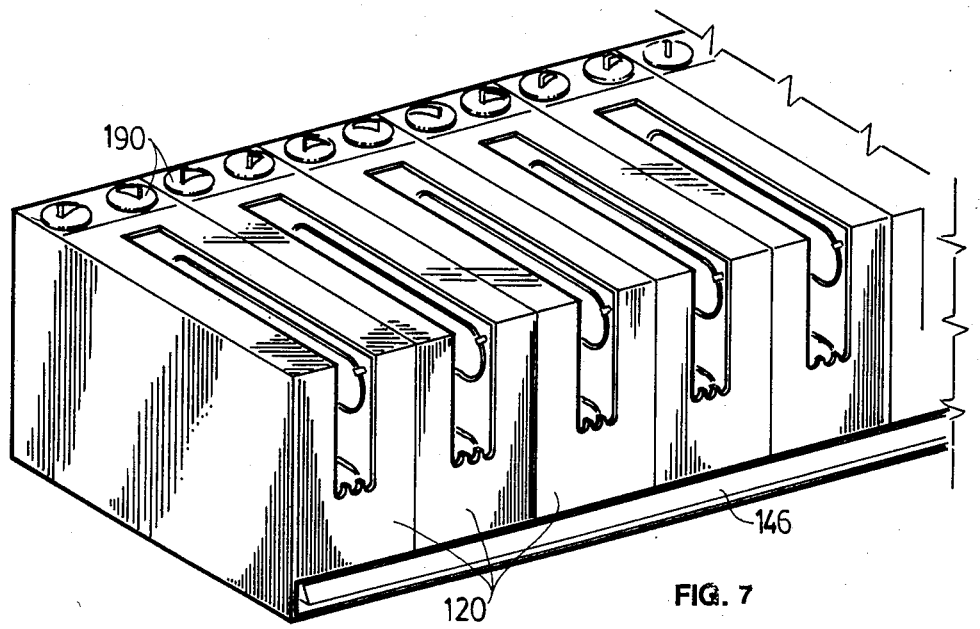
FIG. 7 is an oblique drawing of a more elaborate embodiment of the invention, comprising at least two grilling units ganged together in side-to-side fashion.
Figure 8:
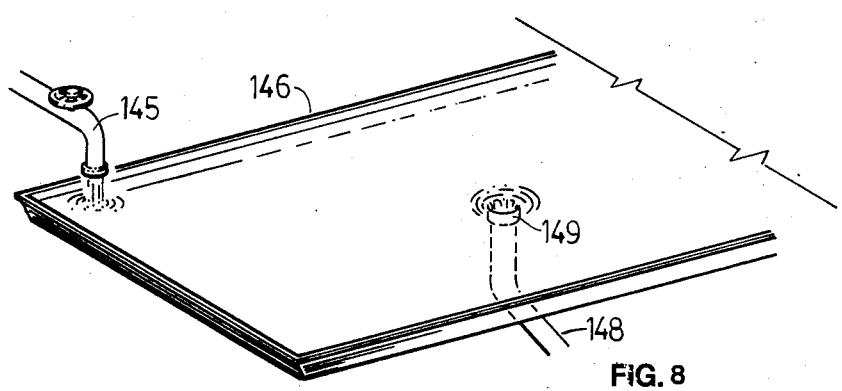
FIG. 8 is a drawing of a large water-holding tray for use with the more elaborate embodiment of the invention.

Referring now to FIG. 7, a more elaborate embodiment of the invention will be described. This embodiment is a grille consisting of a number of grilling units 120 each essentially similar to the grille 20 of the basic embodiment. As an alternative embodiment in such an arrangement, each grilling unit within the array could have, for example, three heating elements and thus two grilling areas, or four heating elements and thus three grilling areas, etc.

Each heating element is controlled by a rheostat 190, and each grilling unit 120 has a timer 192 associated with the power supplied to that unit's rheostats.

In this modular design, any number of grilling units may be ganged together to produce virtually any size of linear array of grilling areas. Each unit may have its own water-holding tray 46, or preferably the side panels between adjacent units do not extend all the way to the bottom panels, permitting the installation of a common water-holding tray 146 extending beneath all of the grilling areas. The water-holding tray 146 is provided with a drain 148 surrounded by a dam 149 to maintain a desired water level in the tray, and valved water supply means 145 are provided for supplying either a manual or automatic, continuous or periodic flow of fresh water to the tray.

It will be appreciated that the above description relates to the preferred and alternative embodiments by way of example only. Many variations on the invention will be obvious to those knowledgeable in the field, and such obvious variations are within the scope of the invention as described and claimed, whether or not expressly described.

What is claimed as the invention is:

1. A grille comprising:

at least two heating elements arranged in spaced facing relationship in substantially parallel and substantially vertical planes, each said heating element being disposed across an area in its plane, whereby grilling areas are defined between said areas in said planes;

removeable means associated with each said grilling area for suspending in said grilling areas articles of food to be grilled; and a tray positioned beneath each said grilling area for holding a small quantity of water, whereby fat and the like falling from said articles of food being grilled falls into water in said tray or trays and is thereby prevented from being further heated to the point of smoking;

said grille being supported in a housing having a relatively large air inlet opening associated with each grilling area extending across at least all of the lower front portion of said housing in front of each said grilling area, and a relatively large air outlet opening extending at least above all of each said grilling area, whereby a substantial volume of air can pass through each said grilling area during grilling.

2. A grille as recited in claim 1, comprising two heating elements, in which electrical power is supplied to said heating elements by virtue of separate wire pairs, one pair for each heating element, running together from said housing before separating to two separate plugs, whereby two standard 110 volt receptacles may be used to power the heating elements, thereby avoiding a need for a 220 volt power supply or other special installations.

3. A grille as recited in claim 1, in which each said removeable means for suspending said articles of food comprises a rack assembly, said rack assembly comprising two racks, one side of one rack detachably engaging in bracket means attached to the corresponding side of the other rack, the other sides of the racks having clamping means for urging said racks together in spaced facing relationship to thereby clamp said article of food between said racks.

4. A grille as recited in claim 3, comprising two heating elements, in which electrical power is supplied to said heating elements by virtue of separate wire pairs, one pair for each heating element, running together from said housing before separating to two separate plugs, whereby two standard 110 volt receptacles may be used to power the heating elements, thereby avoiding a need for a 220 volt power supply or other special installations.

5. A grille as recited in claim 3, in which said bracket means comprises at least two brackets spaced apart along said side, each said bracket having a plurality of slots for engaging said corresponding side of said other rack at different rack spacings as desired, and in which said clamping means comprise at least two posts protruding from one rack towards the other, each post having a plurality of spaced recesses, said other rack having spring-biased means for engaging selected ones of said recesses.

6. A grille as recited in claim 5, comprising two heating elements, in which electrical power is supplied to said heating elements by virtue of separate wire pairs, one pair for each heating element, running together from said housing before separating to two separate plugs, whereby two standard 110 volt receptacles may be used to power the heating elements, thereby avoiding a need for a 220 volt power supply or other special installations.

7. A grille comprising:
   at least two grilling units ganged together in side-to-side fashion, so as to produce an array of grilling areas, each unit comprising at least three heating elements arranged in spaced facing relationship in substantially parallel and substantially vertical planes, each said heating element being disposed across an area in its plane, whereby grilling areas are defined between said areas in said planes; and
   removeable means for suspending in said grilling areas articles of food to be grilled;
   said grilling units being supported in a housing having a relatively large air inlet opening associated with each grilling area extending across at least all of the lower front portion of said housing in front of each said grilling area, and a relatively large air outlet opening extending at least above all of each said grilling area, whereby a substantial volume of air can pass through each said grilling area during grilling.

8. A grille as recited in claim 7, in which each said heating element is controlled by a rheostat, and in which each grilling unit has a timer associated with its power supply so that the unit cannot be left on accidentally for longer than the time set on the timer.

9. A grille as recited in claim 7, in which each said removeable means for suspending said articles of food comprises a rack assembly, said rack assembly comprising two racks, one side of one rack detachably engaging in bracket means attached to the corresponding side of the other rack, the other sides of the racks having clamping means for urging said racks together in spaced facing relationship to thereby clamp said article of food between said racks.

10. A grille as recited in claim 9, in which each said heating element is controlled by a rheostat, and in which each grilling unit has a timer associated with its power supply so that the unit cannot be left on accidentally for longer than the time set on the timer.

11. A grille as recited in claim 9, in which said bracket means comprises at least two brackets spaced apart along said side, each said bracket having a plurality of slots for engaging said corresponding side of said other rack at different rack spacings as desired, and in which said clamping means comprise at least two posts protruding from one rack towards the other, each post having a plurality of spaced recesses, said other rack having spring-biased means for engaging selected ones of said recesses.

12. A grille as recited in claim 11, in which each said heating element is controlled by a rheostat, and in which each grilling unit has a timer associated with its power supply so that the unit cannot be left on accidentally for longer than the time set on the timer.

13. A grille as recited in claim 7, further comprising a tray positioned to extend beneath all of said grilling areas, for holding a small quantity of water, and means for supplying water to said tray and for draining water from said tray, whereby fat and the like falling from said articles of food being grilled falls into water in said tray or trays and is thereby prevented from being further heated to the point of smoking.

14. A grille as recited in claim 13, in which each said heating element is controlled by a rheostat, and in which each grilling unit has a timer associated with its power supply so that the unit cannot be left on accidentally for longer than the time set on the timer.

15. A grille as recited in claim 7, further comprising a tray positioned to extend beneath all of said grilling areas, for holding a small quantity of water, and means for supplying water to said tray and for draining water from said tray, whereby fat and the like falling from said articles of food being grilled falls into water in said tray or trays and is thereby prevented from being further heated to the point of smoking, and in which each said removeable means for suspending said articles of food comprises a rack assembly, said rack assembly comprising two racks, one side of one rack detachably engaging in bracket means attached to the corresponding side of the other rack, the other sides of the racks having clamping means for urging said racks together in spaced facing relationship to thereby clamp said article of food between said racks.

16. A grille as recited in claim 15, in which each said heating element is controlled by a rheostat, and in which each grilling unit has a timer associated with its power supply so that the unit cannot be left on accidentally for longer than the time set on the timer.

17. A grille oven as recited in claim 15, in which said bracket means comprises at least two brackets spaced apart along said side, each said bracket having a plurality of slots for engaging said corresponding side of said other rack at different rack spacings as desired, and in which said clamping means comprise at least two posts protruding from one rack towards the other, each post having a plurality of spaced recesses, said other rack having spring-biased means for engaging selected ones of said recesses.

18. A grille as recited in claim 17, in which each said heating element is controlled by a rheostat, and in which each grilling unit has a timer associated with its power supply so that the unit cannot be left on accidentally for longer than the time set on the timer.

* * * * *